United States Patent
Estrada et al.

(10) Patent No.: US 8,446,377 B2
(45) Date of Patent: May 21, 2013

(54) DUAL SCREEN PORTABLE TOUCH SENSITIVE COMPUTING SYSTEM

(75) Inventors: Julio Estrada, Medina, WA (US); Georg Petschnigg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 12/410,303

(22) Filed: Mar. 24, 2009

(65) Prior Publication Data

US 2010/0245256 A1 Sep. 30, 2010

(51) Int. Cl.
*G06F 3/041* (2006.01)
*G06F 3/01* (2006.01)

(52) U.S. Cl.
USPC .......................................... 345/173; 345/1.1

(58) Field of Classification Search
USPC . 345/1.1, 18.03, 156–157, 173–175; 712/702
See application file for complete search history.

(56) References Cited

U.S. PATENT DOCUMENTS

| | | | |
|---|---|---|---|
| 5,274,758 A | | 12/1993 | Beitel et al. |
| 5,276,796 A | | 1/1994 | Yamada et al. |
| 6,639,606 B1 | | 10/2003 | Choi |
| 7,262,763 B2 | * | 8/2007 | Kinjo .............................. 345/173 |
| 2005/0024341 A1 | * | 2/2005 | Gillespie et al. ............... 345/173 |
| 2005/0052835 A1 | | 3/2005 | Wu et al. |
| 2006/0026536 A1 | * | 2/2006 | Hotelling et al. .............. 715/863 |
| 2006/0034042 A1 | | 2/2006 | Hisano et al. |
| 2006/0064643 A1 | | 3/2006 | Hariton |
| 2007/0085759 A1 | * | 4/2007 | Lee et al. ........................ 345/1.1 |
| 2007/0168855 A1 | | 7/2007 | Patel et al. |
| 2007/0188473 A1 | | 8/2007 | Anwar |
| 2008/0115080 A1 | | 5/2008 | Matulic |
| 2008/0301542 A1 | | 12/2008 | McGee et al. |
| 2009/0244016 A1 | | 10/2009 | Casparian et al. |

OTHER PUBLICATIONS

Shea, Dan, "Planet PDF", "Tiling PDF Documents across Two Screens in Acrobat", retrieved at <<http://www.planetpdf.com/enterprise/article.asp?ContentID=Tiling_PDF_documents_across_two_screens_in_Acrobat>>, May 25, 2006, pp. 3.

Chen, et al., "Navigation Techniques for Dual-Display E-Book Readers", retrieved at <<http://www.cs.umd.edu/~nchen/papers/p1779.pdf>>, CHI 2008, Apr. 5-10, 2008, pp. 1779-1788.

"International Search Report", Mailed Date: Oct. 26, 2010, Application No. PCT/US2010/027229, Filed Date: Mar. 12, 2010, pp. 9.

* cited by examiner

*Primary Examiner* — Adam R Giesy
*Assistant Examiner* — Andrew Sasinowski
(74) *Attorney, Agent, or Firm* — Alleman Hall McCoy Russell & Tuttle LLP (57) ABSTRACT

A touch sensitive computing system is provided, including a first touch sensitive display and a second touch sensitive display. The displays are operatively coupled with a processing subsystem, and with a memory subsystem which stores a plurality of content pages. User interface instructions are stored in the memory subsystem and are executable by the processing subsystem to provide user interactivity with the content pages through the first touch sensitive display and the second touch sensitive display. The interface instructions are further configured to control the displays so that they operate as discretely organized interface units for the content pages.

20 Claims, 5 Drawing Sheets

DUAL SCREEN PORTABLE TOUCH SENSITIVE COMPUTING SYSTEM

BACKGROUND

Modern computing systems are provided with a wide variety of input and output (I/O) mechanisms for allowing a user to interact with stored data. Depending on the operational setting, a given I/O mechanism will result in various benefits and/or limitations for the user-device interaction. Devices that are portable and/or that employ touch sensitive interfaces can pose particular challenges to the design and deployment of I/O mechanisms.

Normally, it is desirable that portable devices be relatively small, which can limit the ability to provide powerful input mechanisms that are easy to use. For example, in the design of laptop/notebook computers and mobile phones, screen size is often sacrificed in order to improve portability. The smaller screen size can limit touch screen input capability, and in general decreases the utility of the device when performing tasks that are well-suited to large screen sizes. Functionalities that often suffer due to these tradeoffs are document creation, and sharing and collaboration among multiple users/participants.

SUMMARY

A touch sensitive computing system is provided. The computing system is provided with various interface features providing numerous advantages in a variety of settings. In particular, the system includes a first touch sensitive display and a second touch sensitive display, both of which are operatively coupled with a processing subsystem, and with a memory subsystem which stores a plurality of content pages. User interface instructions are stored in the memory subsystem and are executable by the processing subsystem to provide user interactivity with the content pages through the first touch sensitive display and the second touch sensitive display. The interface instructions are further configured to control the displays so that they operate as discretely organized interface units for the content pages. Typically, the interface instructions cause one of the displays to operate as a touch sensitive freeform interface for editing one of the content pages, while the other is controlled to provide a navigable overview of the content pages, or a more structured interface for performing editing and viewing functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
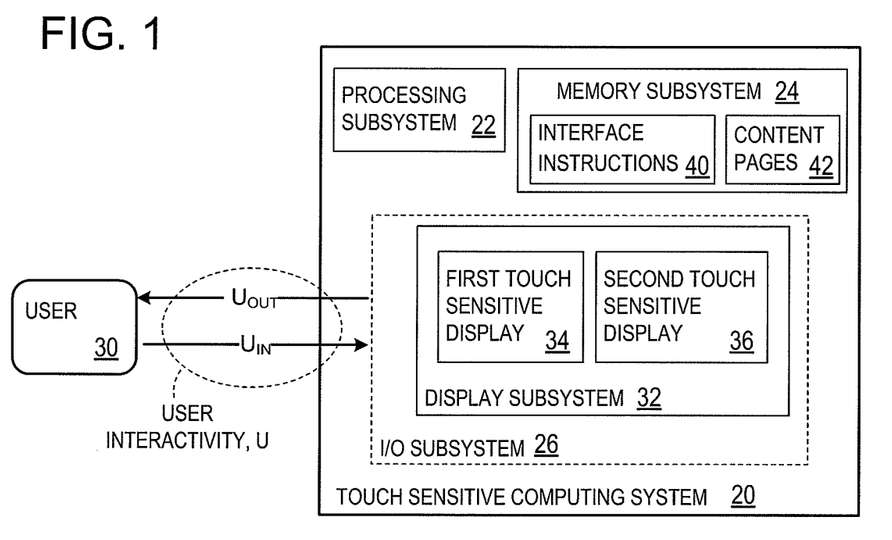
FIG. 1 shows a block diagram of an embodiment of a touch sensitive computing system according to the present disclosure.

Referring to FIG. 1, the figure depicts a touch sensitive computing system 20 according to the present description. As shown, touch sensitive computing system 20 includes a processing subsystem 22, memory subsystem 24 and I/O subsystem 26. These components are operatively coupled via a bus (not shown) or like structure/mechanism. Memory subsystem 24, which may include various types of memory and/or storage devices, typically contains data and applications and/or other instructions which are acted upon or executed by processing subsystem 22. I/O subsystem 26 provides user interactivity U in the form of outputs $U_{OUT}$ to a user 30 (audio, visual, etc.) and mechanisms for receiving user inputs $U_{IN}$.

In many of the examples discussed herein, user interactivity is provided via display subsystem 32, which typically is touch sensitive and includes multiple displays. For example, in FIG. 1, display subsystem 32 includes two displays 34 and 36. As will be discussed in greater detail below, touch sensitive computing system 20 typically includes user interface instructions 40 and/or other applications that are configured to cause the two displays 34 and 36 to operate as discretely organized interface units with respect to content pages 42 stored on the touch sensitive computing system (e.g., in memory subsystem 24). Content pages 42 may take a variety of forms, including web pages, pages from a word processing document, photographs, presentation slides, etc.

Generally, as will be further illuminated in the examples below, one of the displays 34 and 36 provides navigation and more structured user interface controls, while the other provides a touch sensitive freeform interface for modifying individual content pages. Typically, the separate and discretely organized interfaces provided by the displays are implemented so that one of the displays is a relatively more structured and constrained interface, with the other being relatively less so.

Input mechanisms are one category of interface features that may be used to describe the degree to which an interface unit is structured, as opposed to unstructured. For example, in a relatively more structured interface, buttons and/or menu selections (e.g., from pull-down menus) may be used to perform selection and editing operations on a displayed page, such as cut, copy, paste, rotate, crop, etc. For text entry, the structured interface might include a QWERTY keyboard or similar button/key-based method of text entry. For drawing operations, the user may select from clip art, template shapes or other displayed collections of predefined objects.

On the other hand, an unstructured interface would rely exclusively, or at least to a much greater degree, upon freeform inputs, such as handtouch inputs, interpreted gesture commands, and freeform touch inputs effected via user manipulation of a stylus or other pen-type implement.

Referring still to FIG. 1, touch sensitive computing system 20 allows user interactivity with content pages 42 on the device. Content pages 42 may be or include pages of a word processing document, drawings, photographs, presentations, web pages, slides, etc. In many examples discussed herein, touch sensitive computing system 20 is implemented as a portable device, but is provided with various interface features that overcome the limitations of prior portable devices, which, as discussed above, are often ill-suited to document creation, editing and sharing/collaborating tasks.

Figure 2:
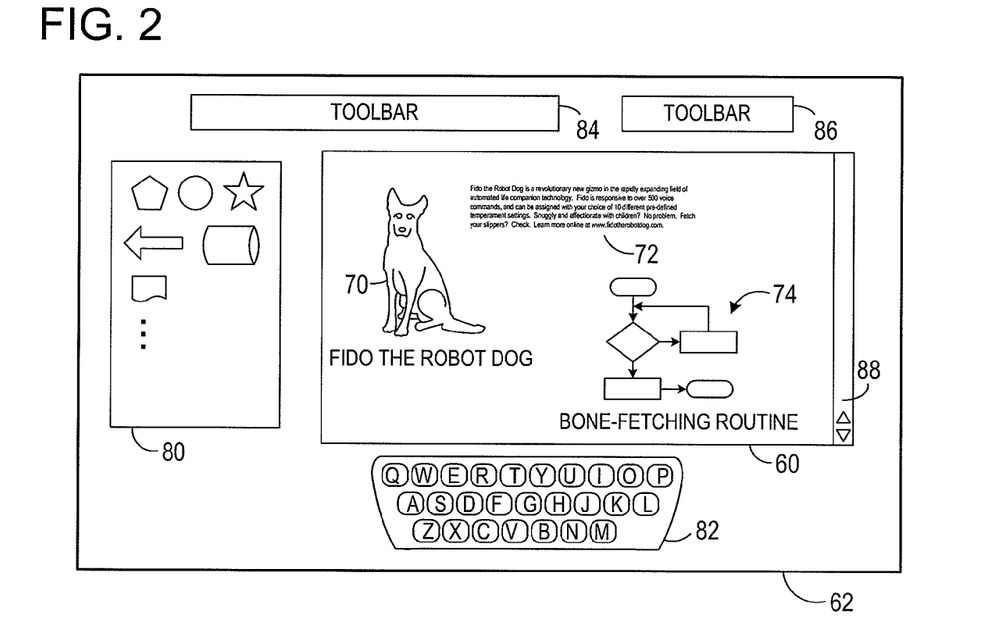
FIG. 2 shows a schematic depiction of an embodiment of an interface for a touch sensitive computing system.
Figure 3:
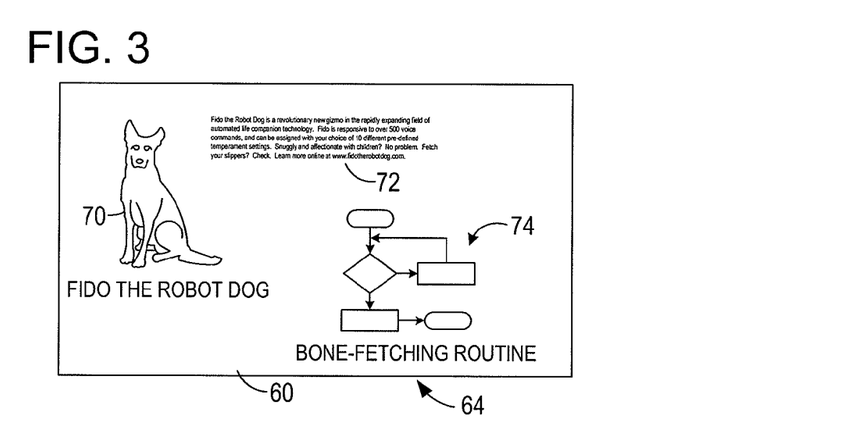
FIG. 3 shows a schematic depiction of another embodiment of an interface for a touch sensitive computing system.

Turning now to FIGS. 2 and 3, both figures show an interface for viewing and making modifications to an example content page 60. Each figure shows a different interface for working with content page 60: FIG. 2 shows a more structured interface 62, which will also be referred to as a UI-burdened interface, while FIG. 3 shows an unstructured interface 64, also referred to as an unburdened or freeform interface.

Referring particularly to content page 60, the example page includes a graphical image 70, a block of text 72 (for example, describing the graphical image 70) and a flowchart 74.

Turning first to structured interface 62, the interface includes various structured input mechanisms for creating and modifying content pages. In particular, the interface may include a template 80 containing various shapes, graphics etc. that can be selected for inclusion on content page 60, for example via a drag and drop operation or by selection and copying. For example, flowchart 74 may be constructed using standard shapes and components found in template 80.

Structured interface 62 may also include a keyboard 82 to enable entry of alpha-numeric text data, such as text block 72. The structured interface may also include other structured input mechanisms, such as pull-down menus or toolbars 84 and 86, to perform copy, cut, paste, move, rotate, crop, etc. operations. The structured interface may also include a scrolling actuator 88 to perform vertical scrolling or other constrained scrolling operations.

Various other input mechanisms and controls may be provided in connection with the structured interface. The above examples are illustrative only. In general, the interface is structured in the sense that the commands and operations that are available are discrete and/or presented to the user in a structured format, and the specific inputs processed to initiate the commands are quantized or otherwise discrete.

Figure 3A:
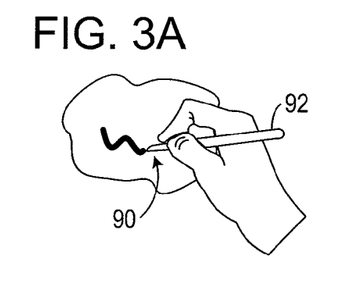
FIG. 3A shows an embodiment of a freeform unstructured interface configured to receive inputs from a pen-type implement.
Figure 3B:
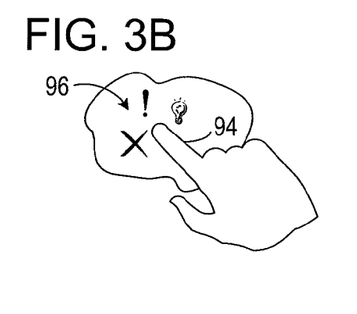
FIG. 3B shows an embodiment of a freeform unstructured interface configured to receive inputs via handtouch gestures.

Referring now to the unstructured, or freeform interface 64 of FIG. 3, the lack of structured interface controls should be immediately apparent. Instead, the interface is configured to receive and process freeform commands, such as user touch gestures and freeform inputs received from a pen-type implement. For example, as shown in FIG. 3A, freeform interface 64 may be configured to receive freeform sketched inputs 90 from pen-type implement 92. FIG. 3B shows another example, in which unstructured interface 64 receives hand-touch gestures 94. Touches to the display screen may also call up contextual touch-operable commands 96 positioned near the point touched by the user.

The freeform nature of interface 64 also means that some processing may occur to interpret user inputs and produce the desired command. Referring to the exemplary flowchart 74, freeform inputs may be used to generate the depicted shapes. For example, the interface could be configured so that an oval is created by using pen-type implement 92 to freehand draw an oval. Being freehand, the drawing input would likely be imperfect. The interface would nonetheless process the input and recognize the user's intention to create an oval. In contrast to the structured method of selecting an oval from template 80 (structured interface 62), a large and continuously variable range of sketched drawing inputs could be used in interface 64 to create an oval.

Accordingly, it will be appreciated that user interface instructions 40 (FIG. 1) may be configured to interpret and process freeform touch inputs (such as the imperfect oval described above) so as to cause the touch inputs to result in a predefined command. For example, in a shape-interpretation mode (e.g., for generating a flowchart), there may be several predefined commands for generating various shapes: ovals, circles, rectangles, diamonds, etc. A given sketched input from a pen-type implement could take various forms. Indeed, the potential range of user input with a pen is continuously variable, unlike for example, the discrete nature of inputs taken to select from multiple items on a pull-down menu. With the pen inputs, the interface instructions process the input and essentially determine the user's intention. Specifically, the input is processed so as to result in one of the predefined commands—e.g., a circle is drawn on the content page instead of a square.

Figure 4:
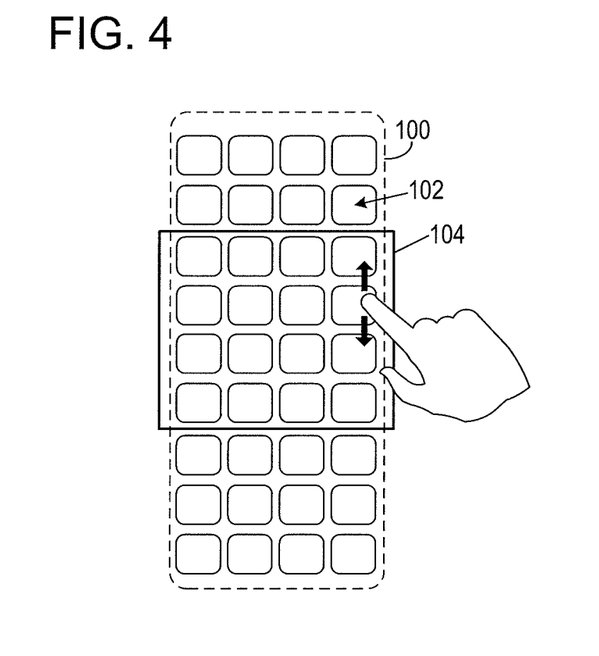
FIG. 4 shows an exemplary navigable overview of an embodiment of a touch sensitive computing system.

In addition to providing structured and unstructured interfaces for working with individual content pages, the displays of touch sensitive computing system 20 may be configured to provide an overview interface for content pages 42. FIG. 4 depicts an example navigable overview 100, including thumbnail depictions 102 of content pages 42. As indicated in the figure, navigable overview 100 may be sized so that it is too large to entirely fit on display 104 (which may be either display 34 or 36). This may result from user adjustments to the magnification of the view. In some cases, for example, it may be desirable to have the thumbnails relatively larger, in order to better understand the contents of the underlying pages. In any case, where the navigable overview extends beyond the edges of display 104, controls may be provided for scrolling to appropriately advance the navigable overview. In particular, as shown in the figure, it will often be desirable to employ the touch sensitive capabilities of the device to allow scrolling via freeform "hand-swipe" or "finger-swipe" gestures.

Figure 5:
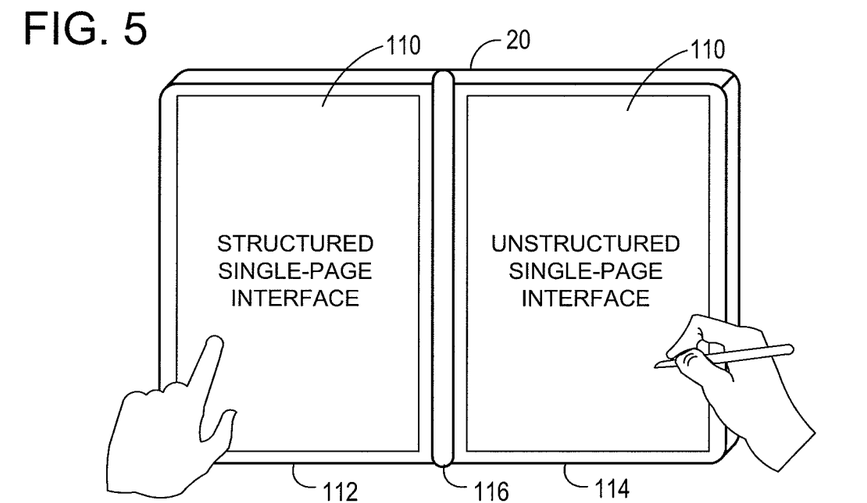
FIG. 5 shows a schematic depiction of an embodiment of a touch sensitive computing system.

As previously discussed, touch sensitive computing system may be configured so that displays 34 and 36 operate as discretely organized interface units with respect to content pages 42. The provision of multiple displays (two in the present examples) that operate separately and discretely in terms of their interface can provide numerous advantages. For example, referring to FIG. 5, the figure shows touch sensitive computing system 20 configured in a mode where both displays offer an editing interface for an individual content page 110, but with one interface being unstructured and the other being structured, as discussed above. FIG. 5 also shows an exemplary notebook-type form factor for the device, in which first and second body portions 112 and 114 are connected via a hinge 116. This form factor is an illustrative example only, and many other configurations are possible. One alternative for example, would be to have a virtual seam between two displays, instead of the physical separation of a hinge. A foldable screen is a further possibility, in order to retain certain characteristics of the notebook-type form factor.

The ready availability of both structured and unstructured access to the page allows the device to leverage the benefits of digital technology, while also allowing the user to relate to the device and interact with it in a more natural and flexible way. The inventors have noted the persistent use of pen and paper for sketching, note-taking and other freeform tasks, despite the continued improvement and ever-increasing use of portable electronic devices. It is contemplated that the described interface systems and methods will provide a significantly enhanced user experience in certain settings, such that the example devices discussed herein will perform well for tasks where paper-and-pen solutions are still preferred.

The provision of multiple, discretely organized interface units can also provide benefits in settings where multiple users are collaborating. One example benefit is the ability to allow multiple users to modify or annotate a content page through separate interfaces, and use the different interfaces to identify the user responsible for the particular change or contribution. For example, the editing interface on display 34 might be assigned to User A, while the interface on display 36 would be assigned to User B.

Figure 6:
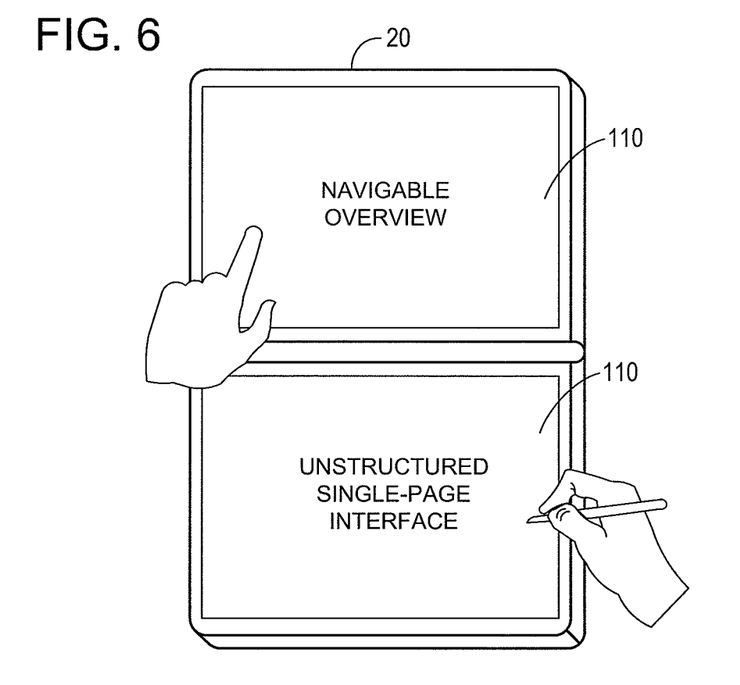
FIG. 6 shows a schematic depiction of another embodiment of a touch sensitive computing system.

Another example of multiple, discretely organized interface units is shown in FIG. 6. Specifically, one display provides a navigable overview, while the other provides an unstructured single-page editing interface. FIG. 6 depicts an example of another feature that may be employed to provide benefits in various settings. Specifically, the device is rotated at a right angle to the depiction shown in FIG. 5, and the device has automatically sensed the rotation and made appropriate rotations to the material presented on the respective displays 34 and 36. More generally, interface instructions may be configured to intelligently arrange and configure displayed material dependent upon the position of the device and/or changes in the rotational orientation of the device. As shown in the example of FIG. 6, the position of the device may be sensed to make appropriate portrait-landscape transitions. The positioning and rotation may also be selected based on the nature of the interfaces used on each display. For example, whenever an unstructured single-page editing interface is used (e.g., unstructured interface 64), it could be placed on a particular side—e.g., the left or right-hand display of device 20. For example, a left-handed user might prefer that the freeform interface always be present on the left-hand display. Similarly, it might be desirable that, when employed, the navigable overview 100 is always positioned on the top screen (in vertical orientations of device 20) or left screen (horizontal orientations).

Figure 7:
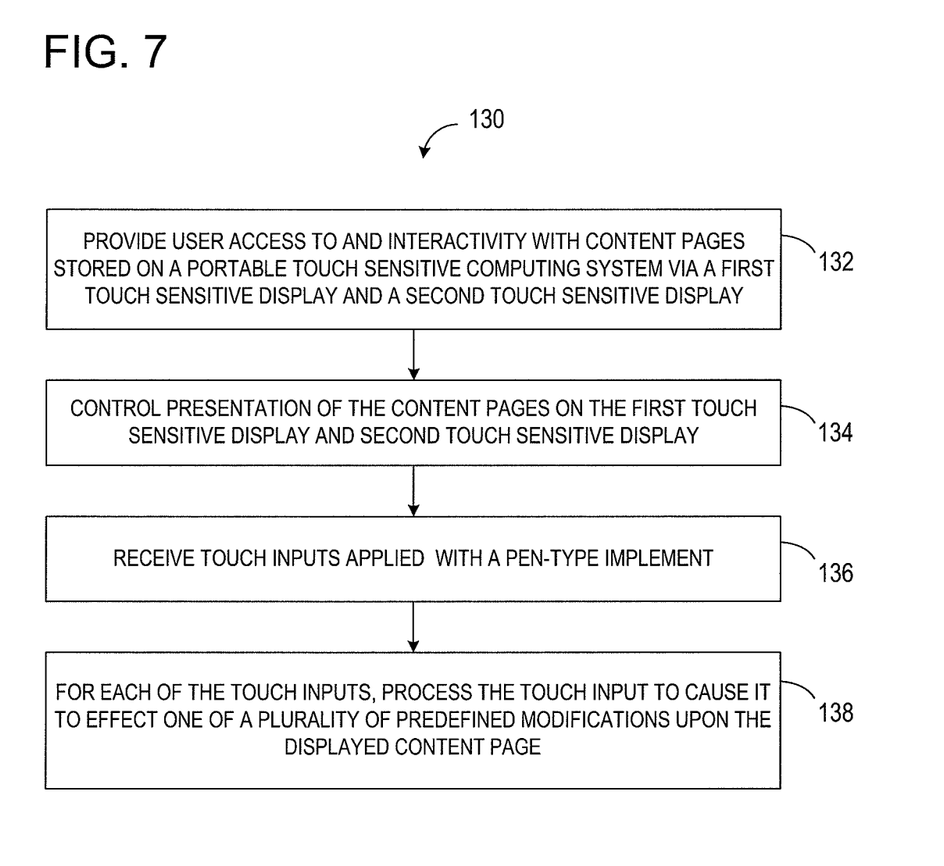
FIG. 7 shows a flow diagram of an embodiment of a user interface method for a portable touch sensitive computing system.

Referring now to FIG. 7, it will also be understood that the present disclosure provides for a user interface method 130 for a touch sensitive display. As shown at 132, the method may include providing user access to and interactivity with content pages stored on a portable touch sensitive computing system via a first touch sensitive display and a second touch sensitive display. At 134, the method further includes controlling presentation of the content pages on a first touch sensitive display and on a second touch sensitive display. Typically, this includes controlling the displays so that they provide discretely organized interface units with respect to the content pages. As part of this discrete organizational and interface approach to the content pages, each display typically includes different interface controls, with one of the displays having a more structured interface and the other having a less structured, freeform interface. In some cases, one of the interfaces (displays) will be used to provide a navigable overview of the content pages. In other cases, both interfaces/displays are implemented as a single-page editing interface, with one being a UI-burdened interface having structured input mechanisms and other interface controls, while the other is a freeform interface adapted to receive pentouch inputs, handtouch gestures and the like. Typically, where both displays are used as single-page editing interfaces, it will often be desirable that they both display the same content page simultaneously for editing.

Continuing with exemplary method 130, where a freeform interface is employed it will often be desirable to use pen-touch inputs, as shown at 136. At 138, the method may further include processing the pentouch inputs so that they result in performing one of a plurality of predefined modifications to a displayed content page.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A portable touch sensitive computing system, comprising:
   a first touch sensitive display;
   a second touch sensitive display;
   a memory subsystem and a processing subsystem operatively coupled with the first touch sensitive display and the second touch sensitive display; and
   user interface instructions storable in the memory subsystem and executable by the processing subsystem to control user interactivity with content pages contained in the memory subsystem of the portable touch sensitive computing system, wherein such user interactivity occurs via the first touch sensitive display and the second touch sensitive display and is controlled by the user interface instructions so that the first touch sensitive display and the second touch sensitive display operate as discretely organized interface units with respect to the content pages, with the first touch sensitive display providing navigation and user interface controls and the second touch sensitive display lacking structured interface controls and providing a touch sensitive freeform interface for receiving and processing freeform inputs to edit the content pages.

2. The system of claim 1, where the user interface instructions, first touch sensitive display and second touch sensitive display are configured so that the first touch sensitive display provides a UI-burdened editing interface for modifying one of the content pages, with the second touch sensitive display simultaneously providing an unburdened freeform editing interface for modifying the one of the content pages via touch inputs received from a pen-type implement.

3. The system of claim 2, where the user interface instructions are configured to interpret the touch inputs received from the pen-type implement and cause such touch inputs to effect one of a plurality of pre-defined modifications to the one of the content pages.

4. The system of claim 2, where the user interface instructions, first touch sensitive display and second touch sensitive display are configured so that the content pages are navigable via handtouch swiping inputs applied to either or both of the first touch sensitive display and the second touch sensitive display, and in particular so that the one of the content pages is replaceable via such handtouch swiping navigation so that a second one of the content pages is displayed on the first touch sensitive display and the second touch sensitive display for editing via the UI-burdened editing interface and the unburdened freeform editing interface.

5. The system of claim 1, where the user interface instructions, first touch sensitive display and second touch sensitive display are configured so that the first touch sensitive display provides a navigable overview of the content pages, with the second touch sensitive display simultaneously providing an unburdened freeform editing interface for modifying one of the content pages via touch inputs received from a pen-type implement.

6. The system of claim 5, where the user interface instructions are configured to interpret the touch inputs received from the pen-type implement and cause such touch inputs to effect one of a plurality of pre-defined modifications to the one of the content pages.

7. The system of claim 6, where the navigable overview is advanceable via touch swiping inputs applied to the first touch sensitive display.

8. The system of claim 1, where the portable touch sensitive computing system further comprises a body having a first body portion coupled via a hinge to a second body portion, where the first touch sensitive display is disposed on the first body portion and the second touch sensitive display is disposed on the second body portion.

9. The system of claim 1, where the user interface instructions are configured to cause automatic switching between landscape and portrait orientations for material displayed on the first touch sensitive display and the second touch sensitive display in response to changes in rotational position of the portable touch sensitive computing system.

10. A portable touch sensitive computing system, comprising:
 a first touch sensitive display;
 a second touch sensitive display;
 a memory subsystem and a processing subsystem operatively coupled with the first touch sensitive display and the second touch sensitive display; and
 user interface instructions storable in the memory subsystem and executable by the processing subsystem to control user interactivity with content pages contained in the memory subsystem of the portable touch sensitive computing system, where such user interactivity occurs via the first touch sensitive display and the second touch sensitive display and is controlled by the user interface instructions so that the first touch sensitive display and the second touch sensitive display operate to simultaneously display a same view of one of the content pages and simultaneously provide two different editing interfaces, the two different editing interfaces having one or more differing input mechanisms from one another and differing interface controls for editing the one of the content pages.

11. The system of claim 10, where the first touch sensitive display provides a UI-burdened editing interface for editing the one of the content pages, and where the second touch sensitive display provides a touch sensitive freeform interface for editing the one of the content pages.

12. The system of claim 11, where the touch sensitive freeform editing interface is configured to receive touch inputs from a pen-type implement, and where the user interface instructions are configured to interpret the touch inputs so as to cause the touch inputs to effect one of a plurality of predefined modifications to the content pages.

13. The system of claim 10, where the user interface instructions are configured to cause the portable touch sensitive computing device to operate in a mode in which at least one of the first touch sensitive display and the second touch sensitive display provide a navigable overview of the content pages.

14. The system of claim 13, where the navigable overview is advanceable via application of handtouch swiping inputs applied to the navigable overview.

15. The system of claim 10, where the user interface instructions are configured to cause automatic switching between landscape and portrait orientations for material displayed on the first touch sensitive display and the second touch sensitive display in response to changes in rotational position of the portable touch sensitive computing system.

16. The system of claim 10, where the portable touch sensitive computing system further comprises a body having a first body portion coupled via a hinge to a second body portion, where the first touch sensitive display is disposed on the first body portion and the second touch sensitive display is disposed on the second body portion.

17. A user interface method for a portable touch sensitive computing system, comprising:
 providing user access to and interactivity with content pages stored on the portable touch sensitive computing system via a first touch sensitive display and a second touch sensitive display;
 controlling presentation of the content pages on the first touch sensitive display and second touch sensitive display so that the first touch sensitive display and the second touch sensitive display operate as discretely organized interface units with respect to the content pages, with the first touch sensitive display providing navigation and structured user interface controls including a structured input mechanism to which a discrete user input is directed in order to perform a first command corresponding to the structured input mechanism and the second touch sensitive display simultaneously providing an unstructured touch sensitive freeform interface for modifying the content pages by interpreting a freeform user input and performing a second command corresponding to the freeform user input that is not directed to any structured input mechanism;
 receiving touch inputs applied to the second touch sensitive display with a pen-type implement; and
 for each of the touch inputs, processing the touch input to cause it to effect one of a plurality of predefined modifications upon one of the content pages displayed upon the second touch sensitive display.

18. The method of claim 17, further comprising providing a navigable overview of the content pages on the first touch sensitive display.

19. The method of claim 17, further comprising displaying one of the content pages simultaneously on both the first touch sensitive display and the second touch sensitive display, where the first touch sensitive display is implemented as a UI-burdened interface for modifying the content page and the second touch sensitive display is implemented as an unstructured interface for modifying the content page.

20. The method of claim 17, further comprising sensing a change in an orientation of the portable touch sensitive computing system and, for content displayed on the first touch sensitive display and the second touch sensitive display, changing between portrait and landscape presentations of such content in response to the change in orientation.

* * * * *